(12) United States Patent
Watson

(10) Patent No.: US 12,315,306 B2
(45) Date of Patent: May 27, 2025

(54) PARKING PAYMENT TRANSACTIONS

(71) Applicant: Brock Watson, Escondido, CA (US)

(72) Inventor: Brock Watson, Escondido, CA (US)

( * ) Notice: Subject to any disclaimer, the term of this patent is extended or adjusted under 35 U.S.C. 154(b) by 32 days.

(21) Appl. No.: 17/767,839

(22) PCT Filed: Nov. 10, 2020

(86) PCT No.: PCT/US2020/059889
§ 371 (c)(1),
(2) Date: Apr. 8, 2022

(87) PCT Pub. No.: WO2021/096890
PCT Pub. Date: May 20, 2021

(65) Prior Publication Data
US 2022/0351550 A1    Nov. 3, 2022

Related U.S. Application Data

(60) Provisional application No. 62/933,966, filed on Nov. 11, 2019.

(51) Int. Cl.
*G07B 15/02*    (2011.01)
*G01S 13/46*    (2006.01)
(Continued)

(52) U.S. Cl.
CPC ............. *G07B 15/02* (2013.01); *G01S 13/46* (2013.01); *G07C 5/008* (2013.01); *G07C 5/0808* (2013.01);
(Continued)

(58) Field of Classification Search
CPC .......... G07B 15/02; H04W 4/44; G01S 13/46; G01S 2013/468; G07C 5/008; G07C 5/0808; G08G 1/042; G08G 1/148
(Continued)

(56) References Cited

U.S. PATENT DOCUMENTS 5,737,710 A  *  4/1998  Anthonyson  ..........  G07B 15/02
                                               701/1
9,846,977 B1 * 12/2017  Cox  .......................  G07C 5/085
(Continued)

FOREIGN PATENT DOCUMENTS

JP          11045358        2/1999
KR        20190004539       1/2019
WO    WO-2018227241 A1 * 12/2018  .............  G06F 3/167

OTHER PUBLICATIONS

A. Ibisch et al., "Towards autonomous driving in a parking garage: Vehicle localization and tracking using environment-embedded LIDAR sensors," 2013 IEEE Intelligent Vehicles Symposium (IV), Gold Coast, QLD, Australia, https://ieeexplore.ieee.org/abstract/document/6629569 (Year: 2013).*

(Continued)

*Primary Examiner* — George Chen
*Assistant Examiner* — Lisa Ma
(74) *Attorney, Agent, or Firm* — Anthony G. Smyth; LOZA & LOZA, LLP

(57) ABSTRACT

Systems, methods, and apparatus are described that enable a serial bus to be operated in one or more modes that employ additional wires for communicating data. A method includes a method includes providing a first interrogating signal configured to cause a controller in a vehicle that is entering the parking facility to monitor status of the vehicle while the vehicle is present within the parking facility, and measure a duration of time in which the vehicle is parked within the parking facility. The method further incudes providing a second interrogating signal when the vehicle is exiting the parking facility, the second interrogating signal being configured to cause the controller to transmit information that includes the duration of time in which the vehicle was parked within the parking facility.

20 Claims, 8 Drawing Sheets

(51) Int. Cl.
    *G07C 5/00* (2006.01)
    *G07C 5/08* (2006.01)
    *G08G 1/042* (2006.01)
    *G08G 1/14* (2006.01)
    *H04W 4/44* (2018.01)

(52) U.S. Cl.
    CPC ............ *G08G 1/042* (2013.01); *G08G 1/148* (2013.01); *H04W 4/44* (2018.02); *G01S 2013/468* (2013.01)

(58) Field of Classification Search
    USPC .......................................................... 705/13
    See application file for complete search history.

(56) References Cited

U.S. PATENT DOCUMENTS

| | | | | |
|---|---|---|---|---|
| 10,373,494 | B1* | 8/2019 | Krysiuk | G06Q 10/00 |
| 2008/0129545 | A1 | 6/2008 | Johnson et al. | |
| 2010/0052946 | A1* | 3/2010 | Levine | G08G 1/147 |
| | | | | 340/932.2 |
| 2012/0188101 | A1* | 7/2012 | Ganot | G07B 15/02 |
| | | | | 340/932.2 |
| 2014/0081718 | A1* | 3/2014 | Leopold | G08G 1/017 |
| | | | | 705/13 |
| 2014/0214499 | A1 | 7/2014 | Hudson et al. | |
| 2015/0149263 | A1* | 5/2015 | Stenneth | G07F 17/24 |
| | | | | 705/13 |
| 2015/0197254 | A1* | 7/2015 | Wysietzki | B60W 40/10 |
| | | | | 701/41 |
| 2016/0217632 | A1* | 7/2016 | Ille | G07C 1/30 |
| 2016/0280131 | A1* | 9/2016 | Carson, Jr. | G07C 5/0866 |
| 2017/0025009 | A1* | 1/2017 | Hakeem | G08G 1/146 |
| 2017/0243488 | A1* | 8/2017 | Meijer | G08G 1/0141 |
| 2019/0057376 | A1 | 2/2019 | Tamayo | |
| 2020/0114926 | A1* | 4/2020 | Liu | G06N 20/00 |
| 2020/0132473 | A1* | 4/2020 | Shipley | G01C 21/1652 |
| 2020/0402402 | A1* | 12/2020 | Howell | G08G 1/144 |

OTHER PUBLICATIONS

PCT/US2020/059889. International Search Report & Written Opinion (Apr. 2, 2021).
Corresponding EP Application No. 20888464.3. Extended Search Report (Oct. 4, 2023).

* cited by examiner

PARKING PAYMENT TRANSACTIONS

PRIORITY CLAIM

This application is the U.S. National Stage of International Patent Application No. PCT/US2020/059889 filed Nov. 10, 2020, which claims priority to and the benefit of provisional patent application No. 62/933,966 filed in the United States Patent Office on Nov. 11, 2019, and the entire content of these applications are incorporated herein by reference as if fully set forth below in their entirety and for all applicable purposes.

TECHNICAL FIELD

The present disclosure relates generally to payment systems, and more particularly to parking payment transactions between consumers and operators.

BACKGROUND

Extant parking solutions require user interaction, whether via mobile app, in a parking facility with an attendant and a gated mechanism for entry and exit or a slotted mechanism to make payment. Additionally, parking meters require minimal user interaction to effect payment upon starting parking, and or updated payment for longer parking sessions. In both cases, parking facilities or parking meters, involve at least some user involvement in all known park-and-pay scenarios.

SUMMARY

Certain aspects of the disclosure relate to systems, apparatus, methods and techniques that provide a parking management system.

In various aspects of the disclosure, a method for managing parking includes receiving a first interrogating signal configured to cause a controller in a vehicle entering a parking facility and, responsive to the second interrogating signal, monitoring status of the vehicle while the vehicle is present within the parking facility and measuring a duration of time in which the vehicle is parked within the parking facility. The method further includes receiving a second interrogating signal when the vehicle is exiting the parking facility, and responsive to the second interrogating signal, transmitting information that includes the duration of time in which the vehicle was parked within the parking facility.

In various aspects of the disclosure, an apparatus for managing parking is provided in a vehicle and includes a wireless communication interface and a controller. The controller may be configured to monitor status of the vehicle while the vehicle is present within a parking facility after detecting a first wireless interrogating signal when entering the parking facility, measure a duration of time in which the vehicle is parked within the parking facility, receive a second interrogating signal when the vehicle is exiting the parking facility, and transmit information that includes the duration of time in which the vehicle was parked within the parking facility in response to the second interrogating signal. The apparatus may include storage that maintains instructions that are followed by the controller when managing or monitoring parking activities of the vehicle.

In various aspects of the disclosure, a method for managing a parking facility includes providing a first interrogating signal to a vehicle that is entering the parking facility, receiving a unique identifier from the controller responsive to the first interrogating signal, receiving sensory information from one or more sensors deployed within the parking facility, the sensory information indicating location and parking status of the vehicle, providing a second interrogating signal when the vehicle is exiting the parking facility, receiving information from the vehicle related to the time spent by the vehicle in the parking facility, and using the information received from the vehicle and the sensory information to determine a parking location and duration of parked time for the vehicle within the parking facility.

In various aspects of the disclosure, an apparatus for managing a parking facility includes a wireless communication interface and a controller. The controller may be configured to cause the wireless communication interface to transmit a first interrogating signal to a vehicle that is entering the parking facility, receive a unique identifier from the controller responsive to the first interrogating signal, receive sensory information from one or more sensors deployed within the parking facility, the sensory information indicating location and parking status of the vehicle, provide a second interrogating signal when the vehicle is exiting the parking facility, receive information from the vehicle related to the time spent by the vehicle in the parking facility, and use the information received from the vehicle and the sensory information to determine a parking location and duration of parked time for the vehicle within the parking facility. The apparatus may include storage that maintains instructions that are followed by the controller when performing tasks and functions associated with managing the parking facility.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, wellknown structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Figure 1:
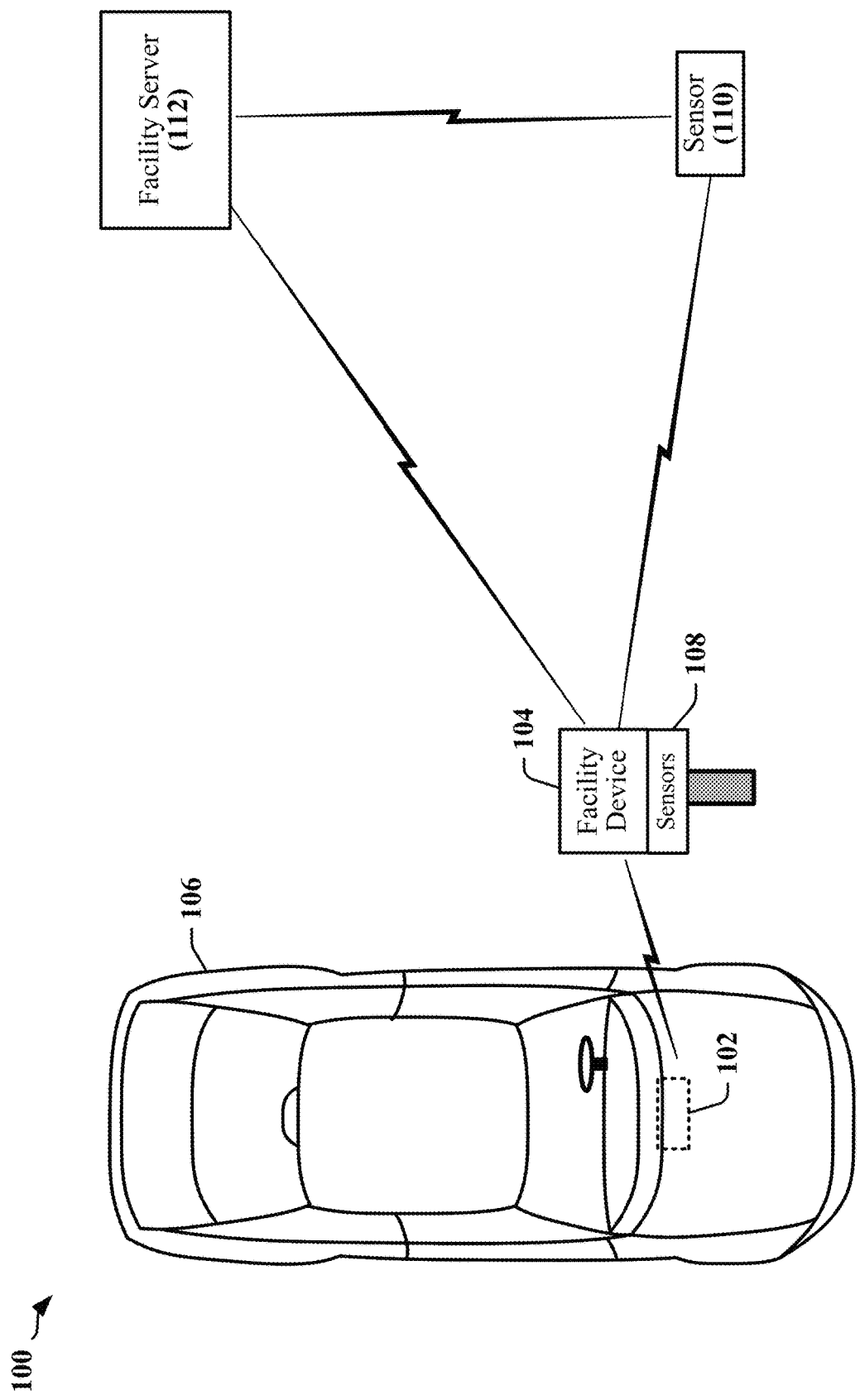
FIG. 1 illustrates an example of a garage access control system in accordance with certain aspects disclosed herein.

FIG. 1 illustrates an example of a garage access control system (the GAC system 100) that may be used for managing, monitoring or tracking vehicles in a parking structure or facility in accordance with certain aspects disclosed herein. In one aspect, a device provided in a vehicle 106, which may be referred to herein as an in-vehicle device 102, may be configured to determine or indicate when the vehicle 106 is in motion, fully stopped and/or parked within the structure, facility or space. The in-vehicle device 102 may provide locational information, including historical information that indicates time spent by the vehicle 106 within the facility and location or locations of the vehicle when stopped or turned off within the facility. The locational and historical information may be used to calculate parking fees for the vehicle based on actual time parked in a parking space, spot or slot.

Information associated with the vehicle 106 may be automatically provided by the in-vehicle device 102 through interactions with one or more parking facility devices 104 located external to the vehicle 106. A parking facility device 104 may be configured to detect and report detection or movement of vehicles 106 that are located or pass sufficiently close to the parking facility device 104 to enable or permit a communication transaction to occur. In some instances, the parking facility device 104 may be located in or near a parking bay, slot or spot, at an entrance or exit point, in a transition lane such as a ramp that interconnects vertical areas of the structure, facility or space or in other locations. In some examples, the parking facility device 104 includes one or more internal sensors 108. In some examples, the parking facility device 104 is coupled to one or more external sensors 110 through a wired or wireless communication link. The external sensors 110 may be used to extend the detection or monitoring range of the parking facility device 104. The internal sensors 108 and external sensors 110 may include strain gauges configured to detect deflections in road surface, proximity detectors, motion detectors, thermal detectors, microphones, electromagnetic sensors or wireless signal detectors, including wireless signal detectors configured for triangulation.

In some instances, the parking facility device 104 may have a processing circuit capable of managing or monitoring events associated with the presence or transition of a vehicle 106 within the facility or near the facility. The parking facility device 104 may be operated as an application server that is configured to process and analyze information received from vehicles 106 or other parking facility devices 104. The parking facility device 104 may use the information received from vehicles 106 or other parking facility devices 104 to calculate or assign parking fees for the vehicle based on actual time parked in a parking space, spot or slot. The parking facility device 104 may be located in a parking bay, parking slot, parking space or parking spot, at an entrance or exit point of the facility, or in a transition lane such as a ramp that interconnects vertical areas of the structure, facility or space or in other locations.

The GAC system 100 may include one or more facility servers 112 that can exchange information with multiple parking facility devices 104. A facility server 112 may be configured to track and monitor multiple vehicles through the parking facility and may be further configured to monitor occupancy or availability of parking bays, slots, spaces or spots. A facility server 112 may be configured to calculate and process payment information for vehicles 106 that use the parking facility. The facility server 112 may calculate charges using some combination of a minimum charge and time-based charges. The time-based charges may be calculated or estimated using the time during which a vehicle is parked within the parking facility and may be contingent on the vehicle 106 being stopped within a parking spot, slot, space or bay. In some instances, the time-based charges may be calculated or estimated using rates that vary based on the parking spot, slot, space or bay used to park the vehicle, the time of day, day of week and month or holiday period in which the vehicle was parked, the size or type of vehicle and/or other factors. In one example, a parking spot, slot, space or bay located close to a pedestrian access point or on a lower floor of a high-rise structure may be charged at a different rate than parking spots, slots, spaces or bays located at greater distances from the pedestrian access point or on higher floors of the high-rise structure. The facility server 112 and in-vehicle device 102 may cooperate to determine the totality of time a vehicle spends in the parking facility, the duration of time the vehicle is parked and the location of the parking spot, slot, space or bay in which the vehicle is parked. In some implementations, the GAC may communicate time, location and other parking-related information over a wide area network or other connection to a payment processing system configured to calculate and process payment information for vehicles that use one or more parking facilities.

A facility server 112 may be configured to track a vehicle 106 through a facility that includes multiple zones managed or monitored by individual parking facility devices 104. In some implementation, a facility server 112 may operate as a parking facility device 104, performing one or more functions associated with parking facility devices 104. For example, the facility server 112 may be located at an entrance or exit point and may be configured to handle interactions with vehicles 106 arriving or departing the facility.

In some implementations, multiple parking facility devices 104 are deployed to ensure that vehicles 106 within the facility are sufficiently close to a parking facility device 104 to allow constant wireless monitoring of the vehicles 106 or communication between in-vehicle devices 102 and the GAC system 100. In some examples, wireless communication is not available throughout the facility and the vehicle 106 may record and report its activities and locations when it next encounters a parking facility device 104. In some instances, an operator of the vehicle 106 may initiate or participate in an interaction involving the in-vehicle device 102 and a parking facility device 104. In some instances, an operator of the vehicle 106 may initiate or participate in such an interaction, typically using hands-free techniques and/or processes.

In some implementations, sensors 110 are deployed throughout the facility such that the location and status of a vehicle 106 within the facility can be known with at least a minimum level of certainty. In some examples, location and status information derived from sensors 110 may be used to verify or correlate location and status reported by the vehicle 106.

In certain aspects of the disclosure, systems, apparatus and methods are provided for monitoring the activities and parking time of the vehicle 106 within a parking facility. Monitoring, reporting, billing and/or payment activities may be conducted without the intervention or participation of the operator of the vehicle 106, thereby providing for hands-free parking in the parking facility. In some implementations, parking charges can be expected to be limited to the actual time period in which the vehicle 106 is parked. The GAC system 100 may determine the time period in which the vehicle is parked based on a point in time at which the vehicle 106 is determined to have stopped in a parking bay, space, slot or spot and the point in time when the vehicle 106 is determined to have left the parking bay, space, slot or spot and/or exits the parking facility.

Figure 2:
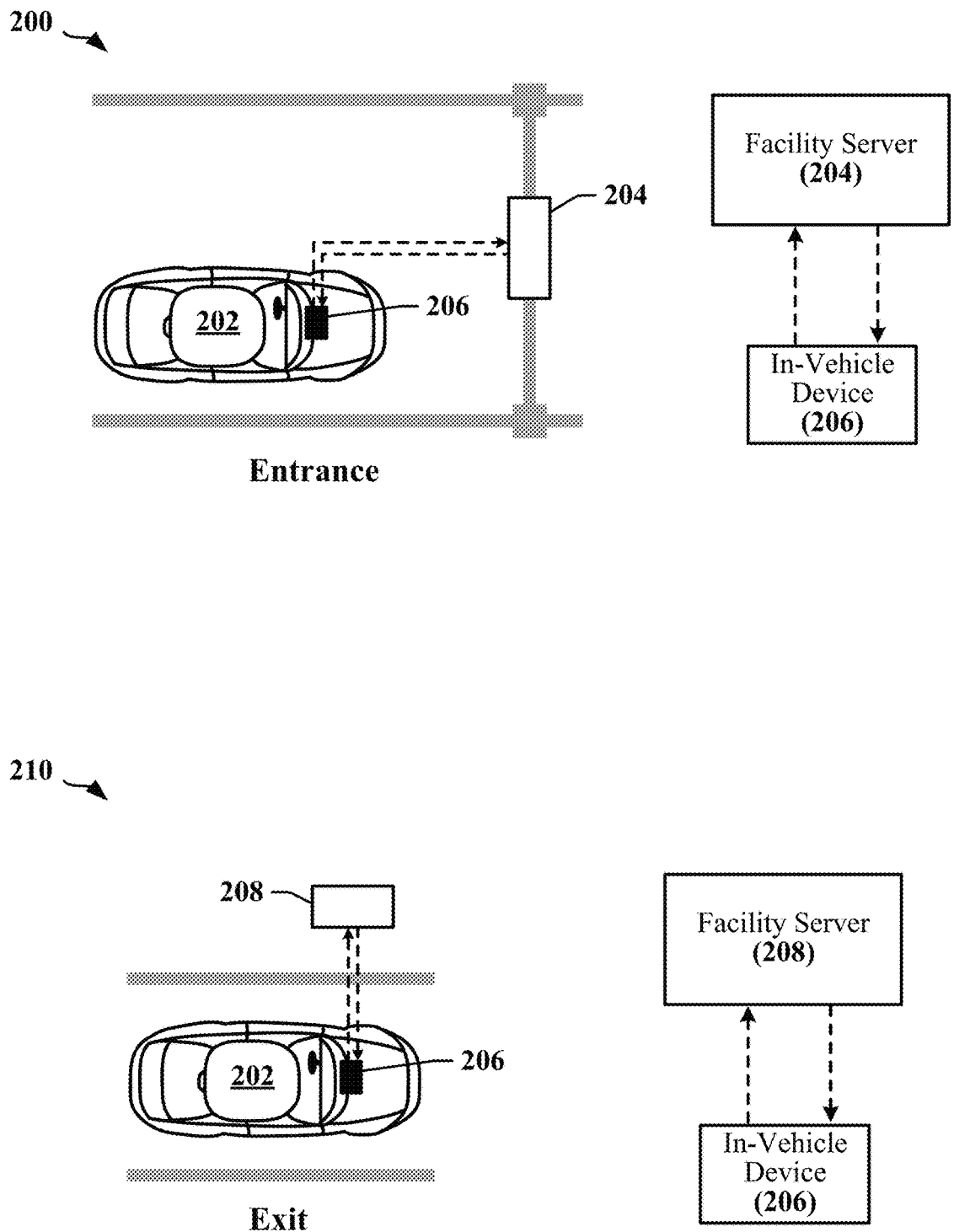
FIG. 2 illustrates entry and exit points to a parking facility, which may be a parking garage in accordance with certain aspects of this disclosure.

FIG. 2 illustrates an entry point 200 in a parking facility or structure and an exit point 210 in the parking facility or structure. In one example, the parking facility or structure may include a parking garage that has been equipped with a GAC system 100 for managing vehicles in accordance with certain aspects of this disclosure. A parking facility server 204 may be provided at the entry point 200 of the parking facility. The parking facility server 204 may be configured to track and report events corresponding to the entrance of one or more vehicles 202. In some implementations, the parking facility server 204 may be located elsewhere within the parking facility and may communicate with facility devices or sensors that are configured to provide alerts and other information that enables the parking facility server 204 to track and report events corresponding to the entrance of vehicles 202.

In some instances, a parking facility server 208 may be located at or near an exit point 210 of the parking facility. In one example, a vehicle 202 is equipped with an in-vehicle system 206 that is configured to detect or determine a time at which the subject vehicle 202 is initially parked in a parking bay, space, slot or spot and a time at which the subject vehicle 202 leaves the parking bay, space, slot or spot. The in-vehicle system 206 may be configured to record the duration of time that the vehicle 202 has been parked. The in-vehicle-system 206 may include a storage device that maintains information regarding the status or disposition of the vehicle 202 while in the parking facility. The in-vehicle system 206 may communicate status or disposition information to a facility server 204, 208, a parking facility device or other type of monitoring device, and the communicated information may include time parked and/or time elapsed since entry to the parking facility.

In some instances, a GAC system is implemented and managed within the parking facility using a single facility server 204 or 208 or multiple facility servers 204 and 208. For example, management and control functions of the GAC system may be shared between multiple facility servers 204, 208. In some examples, a first facility server 204, 208 is configured to manage and control GAC operations and a second facility server 208, 204 serves in a backup role. In one example, a facility server 204 is located near the entry point 200 of the facility and a different type of parking facility device or monitoring device such as a sensor is located at the exit point 210. In another example, a facility server 208 is located near the exit point 210 of the facility and a different type of parking facility device or monitoring device such as a sensor is located at the entry point 200.

The presence of the vehicle 202 within the parking facility, between entry and exit points may be monitored through an instrumented function and flow of the vehicle 202. A vehicle 202 may be interrogated upon entering the parking facility. In one example, a parking facility server 204 may cause a transmitter to provide wake-up signal when the vehicle 202 enters the parking facility. The wake-up signal may be provided as a request for identification, and the in-vehicle system 206 may respond with a unique vehicle identifier (VID) associated with the vehicle 202. The wake-up signal and/or receipt of a responsive VID initiates monitoring and tracking by the parking facility server 204, 208 or the in-vehicle system 206, individually or in combination. Monitoring and tracking systems may determine movements, parking-related activity, and subsequent departure of the vehicle 202 from a parking bay, slot, space or spot. The in-vehicle system 206 may capture and store information that identifies the actual time in which the vehicle 202 is parked, and such information may be provided to the parking facility server 204 while the vehicle 202 is exiting the parking facility. For example, the in-vehicle system 206 may be interrogated or pinged by a transmitter while the vehicle 202 is at an exit point 210 of the parking facility which may be controlled by a parking facility server 208. The in-vehicle system 206 may respond with the VID associated with the vehicle 202 and may provide information that can be used to determine the total time that the vehicle 202 was parked. In some instances, the in-vehicle system 206 may provide information, including information identifying one or more parking bays, spaces, slots or spots used by the vehicle 202. A GAC system implemented within the parking facility can be used to establish the relationship between vehicle 202 activities, including times associated with parking, and in-bound, transitory, and out-bound movements.

In some examples, the in-vehicle system 206 may be battery powered and can operate in a standalone mode. The in-vehicle system 206 may be configured with a low-power microcontroller and a Bluetooth transceiver that can be operated as a low energy in accordance with certain Bluetooth specifications or protocols. The in-vehicle system 206 may be configured to respond to beacons transmitted by the GAC system. The beacons may be transmitted periodically or in response to a vehicle detection event. The in-vehicle system 206 may exchange identification data with the GAC system in one or more encrypted wireless communication transactions. The reception of a beacon and exchange of identification data associated with an entry by the vehicle 202 into the parking facility may serve as a wake-up signal that transitions the in-vehicle system 206 to a "slot parking" mode.

The in-vehicle system 206 may generate or receive another type of wake-up signal or event when leaving a parking bay, slot, space or spot. This type of wake-up causes the in-vehicle system 206 to transition to a "leaving parking slot" mode. The in-vehicle system 206 may generate or receive another type of wake-up signal or event when exiting the parking facility. This type of wake-up signal or event may be generated in response to communication between the in-vehicle system 206 and the GAC system. The communication between the in-vehicle system 206 and the GAC system may include transmissions according to Bluetooth protocols. The wake-up signal or event generated when exiting the parking facility causes the in-vehicle system 206 to transition to a "beacon search" mode.

The GAC system may determine location of the vehicle 202 using triangulation. In one example, the GAC system may receive input from multiple Bluetooth antennas and may triangulate a Bluetooth transmission from the in-vehicle system 206 to determine location of the vehicle 202 relative to the antennas or relative to the GAC system. The Bluetooth antennas may be provided in different devices. In some example, wireless signal sensors may be used for triangulation. Triangulated location can be used to determine when an in-vehicle system 206 is approaching, entering or moving within the parking facility. In one example, the GAC system may determine received power at each of the antennas, although other methods of triangulation may be used, including triangulation based on relative phase differences of received signals.

The in-vehicle system 206 may determine relative location of the vehicle 202 or changes in location using one or more sensors configured to operate as accelerometers, displacement sensors and/or vibrations sensors. In some examples, accelerometers, displacement sensors and vibrations sensors are implemented using micro-electromechanical system (MEMS) sensor devices. A first MEMS sensor device may be used to determine displacement along x, y, z axes corresponding to the vehicle 202. The first MEMS sensor device may be used to determine whether x, y, z displacement is indicative of the vehicle 202 being stopped or being in motion for a preconfigured or predetermined period of time or minimum time. In some instances, an accelerometer may be used for vibration analysis based on displacement in the vertical (y) direction, for example.

A second MEMS sensor device may be used to determine a level of vibration detected in the chassis, frame or body of the vehicle 202. The second MEMS sensor device may indicate when there is minimal or no vibration in the vehicle 202. The second MEMS sensor device may indicate when there is significant level of vibration in the vehicle 202. Levels of vibration may be determined to be significant based on measured or estimated energy in the vibration, peak amplitude of the vibration, frequency distribution associated with the vibration or based on other aspects of the vibration. The in-vehicle system 206 may be configured to perform correlation, pattern recognition or statistical analysis on measurements of vibration that enable the in-vehicle system 206 to determine when the engine is running, when the vehicle is moving or determine other characteristics or operations of the vehicle 202. In some instances, levels of vibration over some period of time may be used to determine that the engine is started and running.

Figure 3:
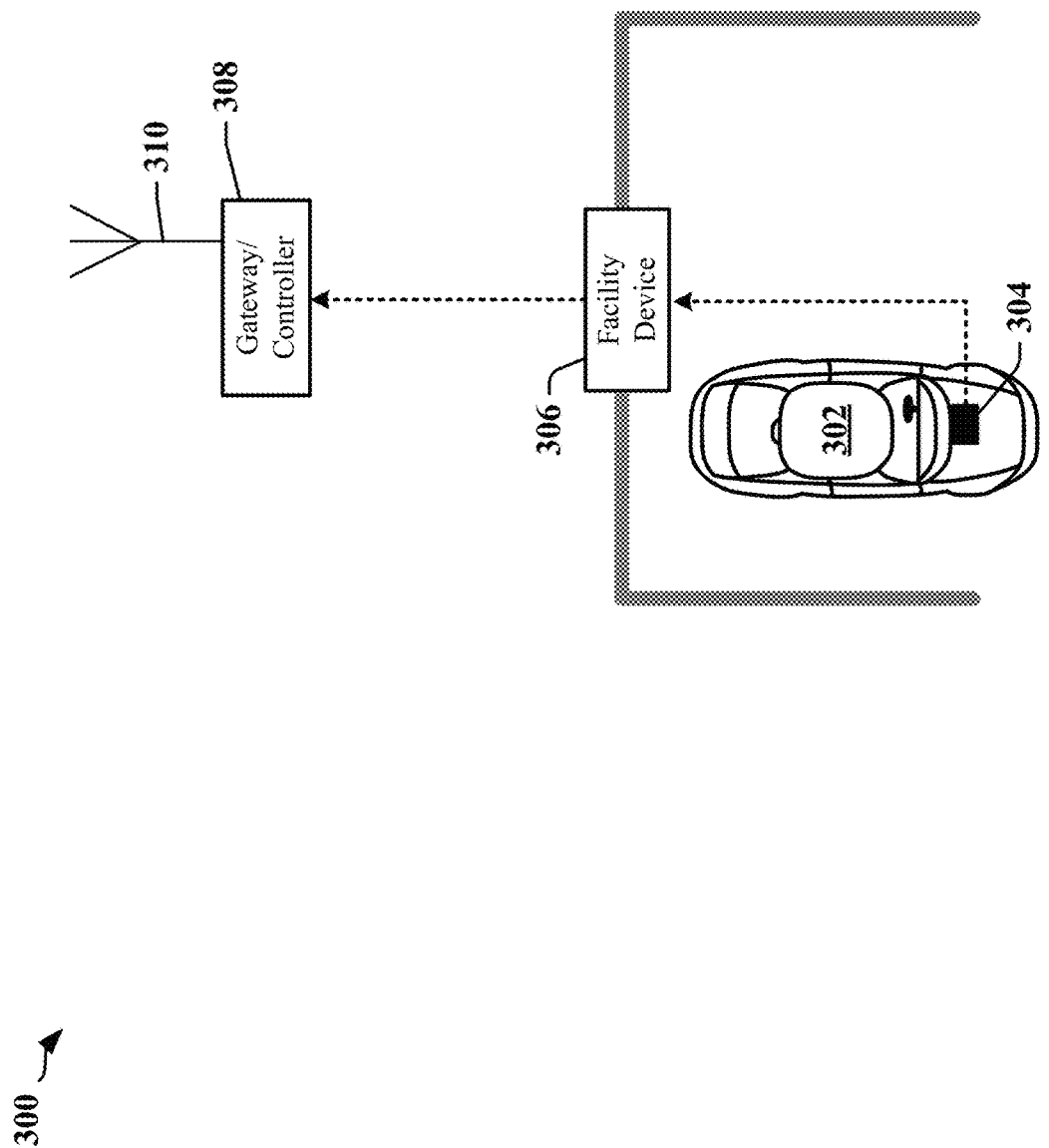
FIG. 3 illustrates certain aspects of an exit point of a parking facility in accordance with certain aspects disclosed herein.

FIG. 3 illustrates certain aspects of an exit point 300 of a parking facility. In FIG. 3 a vehicle 302 is exiting the parking facility. An in-vehicle system 304 embedded in the vehicle 302 may be configured to store information related to the time spent by the vehicle 302 within the parking facility, including the time parked. A parking facility device 306 may communicate with the in-vehicle system 304 while the vehicle 302 is exiting the parking facility. The in-vehicle system 304 may include or be coupled to a storage that maintains a unique identifier, such as a VID associated with the vehicle 302. The in-vehicle system 304 may communicate the VID and the information related to the time spent by the vehicle 302 within the parking facility to the parking facility device 306. In some implementations, the parking facility device 306 may be coupled to a gateway or controller 308 that communicates information received from the parking facility device 306 to one or more management servers. In some implementations, the parking facility device 306 and/or the gateway or controller 308 may communicate through the Internet, a telecommunication network and/or another wide area network. The gateway or controller 308 may be configured to record information received from vehicles that enter and/or exit the parking facility. In some implementations, the gateway or controller 308 forwards information received from in-vehicle systems 304 and/or the parking facility device 306 that is pertinent to diagnostics, billing, and customer interface systems. In some implementations, the gateway or controller 308 includes one or more sensors and is used to track vehicles through the facility. In some implementations, the gateway or controller 308 includes one or more antennas 310 that may be used to triangulate the position of vehicles within the facility.

According to certain aspects of this disclosure, the in-vehicle system 304 may include or be coupled to multiple on-board sensors. In some instances, one or more sensors may be provided for the use of the in-vehicle system 304. In some instances, the in-vehicle systems 304 may interact with a vehicle management system or with sensors associated the vehicle management system. The in-vehicle systems 304 may be configured to monitor information received from sensors, vehicle management systems, parking facility devices 306, servers, gateways or controller 308 and to estimate or calculate movement, position, acceleration, entry or exit events and generate other information related to the presence of the vehicle 302 in the parking facility. A server or other parking facility device 306 operated within the GAC system may use the information received from sensors, vehicle management systems, parking facility devices 306, servers, gateways or controllers 308 to calculate payment information related to the presence of the vehicle 302 in the parking facility.

Figure 4:
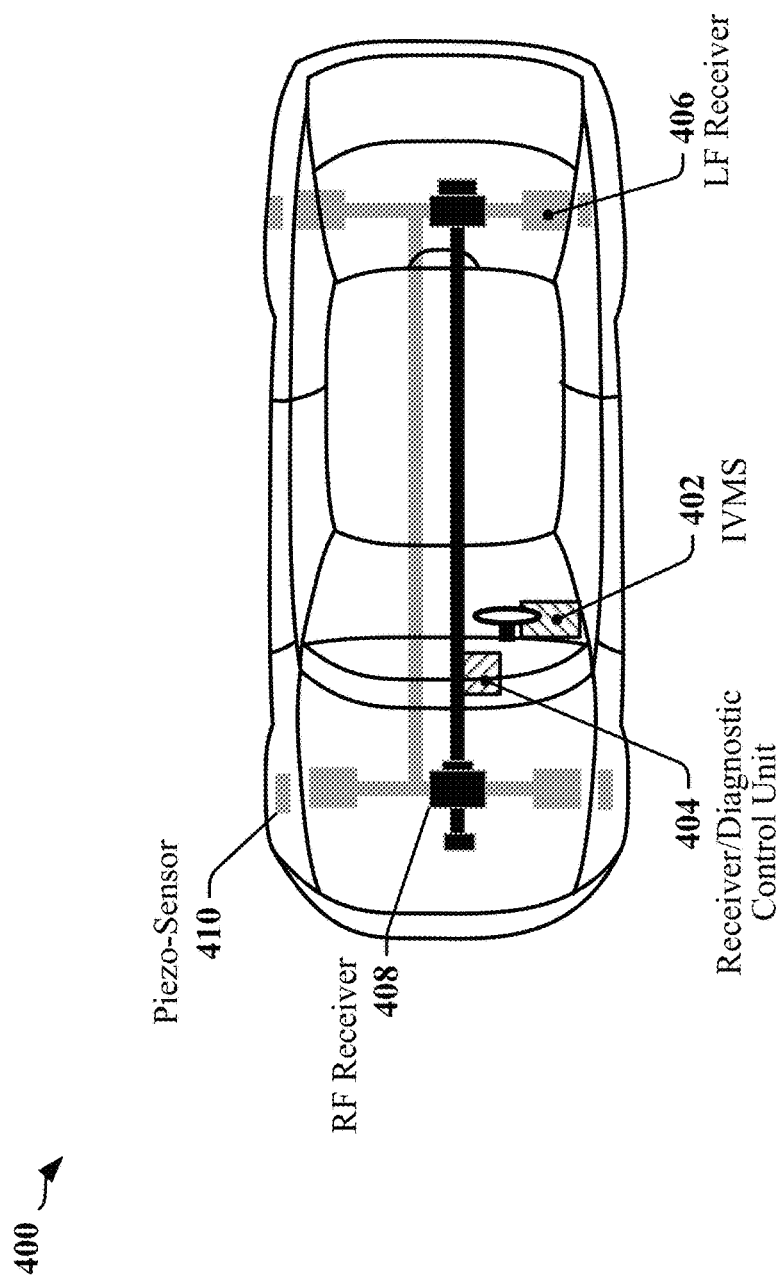
FIG. 4 illustrates a vehicle that may include an embedded in-vehicle system provided in accordance with certain aspects disclosed herein.

FIG. 4 illustrates a vehicle 400 that may be configured with an embedded in-vehicle system 402 that is configured in accordance with certain aspects disclosed herein. In some implementations, the in-vehicle system 402 may be interconnected with one or more vehicle management systems and/or in-vehicle networks. Several measurements, indications, sensor inputs, parameters or other factors may be considered when determining when the vehicle 400 has been parked. The in-vehicle system 402 may include or communicate with on-board sensors such as a MEMS vibration sensor, an accelerometer, a gyroscope, etc. The in-vehicle system 402 may include a Bluetooth and/or a near-field communication interface that permit the in-vehicle system 402 to communicate with one or more components of the vehicle 400. In one example, the in-vehicle system 402 may use a Bluetooth interface to communicate with a strategically placed piezoelectric sensor 410 and/or an engine control unit through a Bluetooth receiver associated with the Tire-Pressure-Sensor-Monitoring systems 406 of the vehicle 400. In another example, the in-vehicle system 402 may communicate with a diagnostic system 404 in the vehicle 400. In another example, the in-vehicle system 402 may communicate with a Bluetooth transmitter or receiver associated with a powertrain or transmission control system 408 in the vehicle 400. In other examples, the in-vehicle system 402 may communicate with other vehicle management systems, including entertainment systems, steering or brake control systems, climate control systems and navigation systems in the vehicle 400 in order to obtain status and location information.

In some implementations, the in-vehicle system 402 may cooperate with vehicle control and monitoring systems to determine when the vehicle 400 has parked, when the vehicle 400 is restarted, when the vehicle 400 is in motion and/or when the vehicle 400 has departed the parking slot. The monitoring systems may employ a set of differentiated hardware and system software modules that cooperate to enable a parking facility management system to determine when the vehicle 400 has entered and parked in a parking slot, spot, space or bay and when the subject vehicle has exited the parking slot, spot, space or bay. In one example, the monitoring systems include four subsystems that can provide well-defined techniques and procedures for indicating when the subject vehicle has come to a complete halt and has parked in a parking bay, space, slot or spot.

A first subsystem may include a MEMS-based electromechanical component that can be integrated into the embedded in-vehicle system 402. Measurements or estimates of discrete changes in displacement of the vehicle 400 in x, y or z axes may be generated using three accelerometer components. Measurements or estimates of displacement may be generated using comparisons of received accelerometer values with preconfigured or predetermined baseline accelerometer values. In one example, baseline accelerometer values can be established through measurement, computation or algorithmic calculation over a stable time period. The comparison of the displacements may produce a first partial determinate that can be stored in persistent memory of the in-vehicle system 402.

In some examples, a second subsystem receives the first partial determinate obtained from the comparison of displacements and from a second partial determinate of collected vibration values. The second partial determinate may be stored in persistent memory. The second partial determinate may be obtained by comparing preconfigured or predetermined baseline vibration values to a sequence of vibration readings. The baseline vibration values may be collected, measured, computed or algorithmically calculated over a stable time period from one or more associated MEMS-based electro-mechanical vibration components.

A third subsystem may employ one or more independent components that can transmit motion information related to changes of motion. For example, information related to changes of motion may be obtained from sensors configured to determine changes in tire rotation. In some instances, the sensors may determine changes in tire rotation using piezoelectric sensors 410. In another example, the motion information may be based on information produced by a tire pressure monitoring system.

A fourth subsystem may employ front or rear Bluetooth in-car components to communicate with an Engine Control Unit of the vehicle 400, retrieving information pertaining to state of the vehicle 400. State of the vehicle 400 may include information identifying ignition off and/or battery voltage level.

Figure 5:
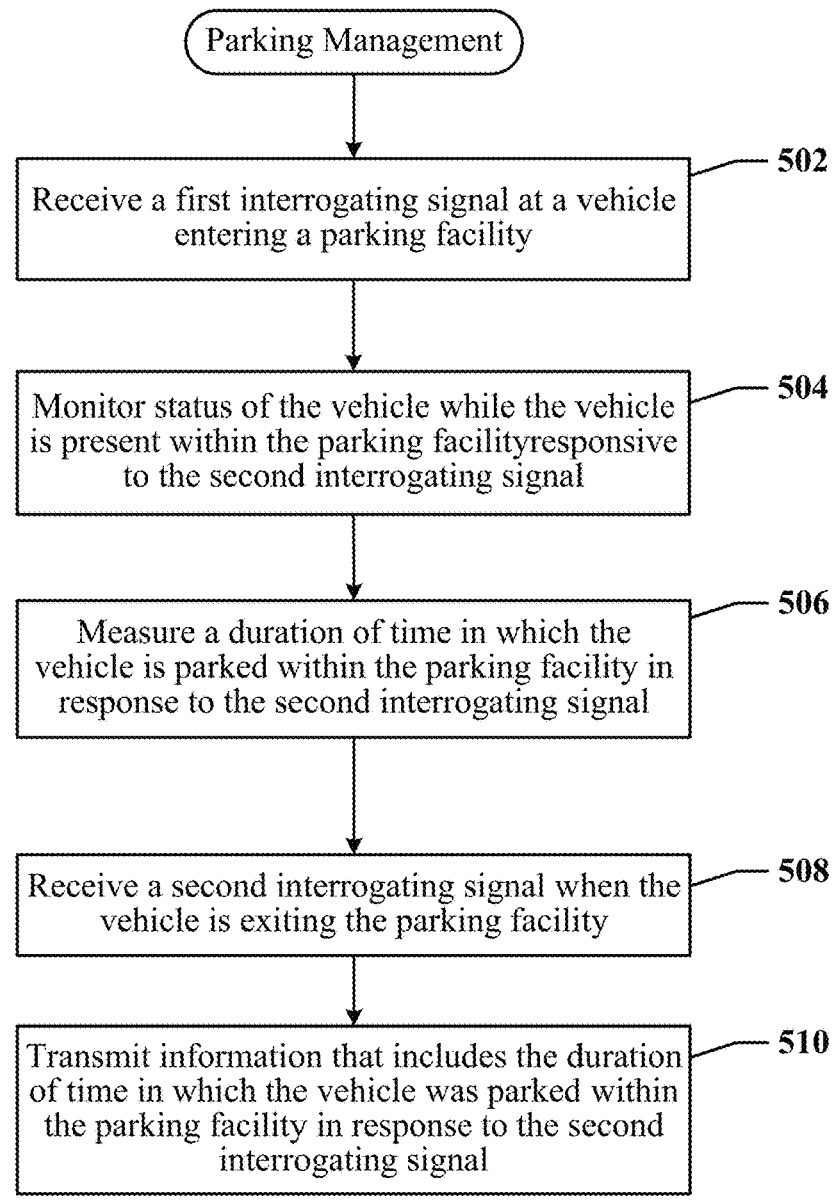
FIG. 5 is a flowchart illustrating a method for managing parking in accordance with certain aspects disclosed herein.

FIG. 5 is a flowchart 500 illustrating a method for managing parking that may be performed by a device embedded in a vehicle in accordance with certain aspects of this disclosure. At block 502, the device may receive a first interrogating signal at a vehicle entering a parking facility. In response to the first interrogating signal, at block 504 the device may monitor status of the vehicle while the vehicle is present within the parking facility, and at block 506 the device may measure a duration of time in which the vehicle is parked within the parking facility. At block 508, the device may receive a second interrogating signal when the vehicle is exiting the parking facility. At block 510, the device may transmit information that includes the duration of time in which the vehicle was parked within the parking facility in response to the second interrogating signal.

In one example, the device may transmit a unique identifier in response to the first interrogating signal and may transmit a unique identifier in response to the second interrogating signal. In one example, the device may exclude time elapsed while the vehicle is moving within the parking facility from the duration of time in which the vehicle is parked within the parking facility.

In some examples, the device may receive sensory information from one or more sensors, and may determine that the sensory information indicates that the vehicle is parked within the parking facility. The one or more sensors may include a piezoelectric motion sensor or an accelerometer. The one or more sensors may include a MEMS displacement sensor. The one or more sensors may include a MEMS vibration sensor.

In some examples, the device may receive vehicle status information from a vehicle management system and may determine that the sensory information indicates that the vehicle is parked within the parking facility. The vehicle management system may include a braking management system. The vehicle status information may relate to status of an ignition system or a battery voltage level.

Figure 6:
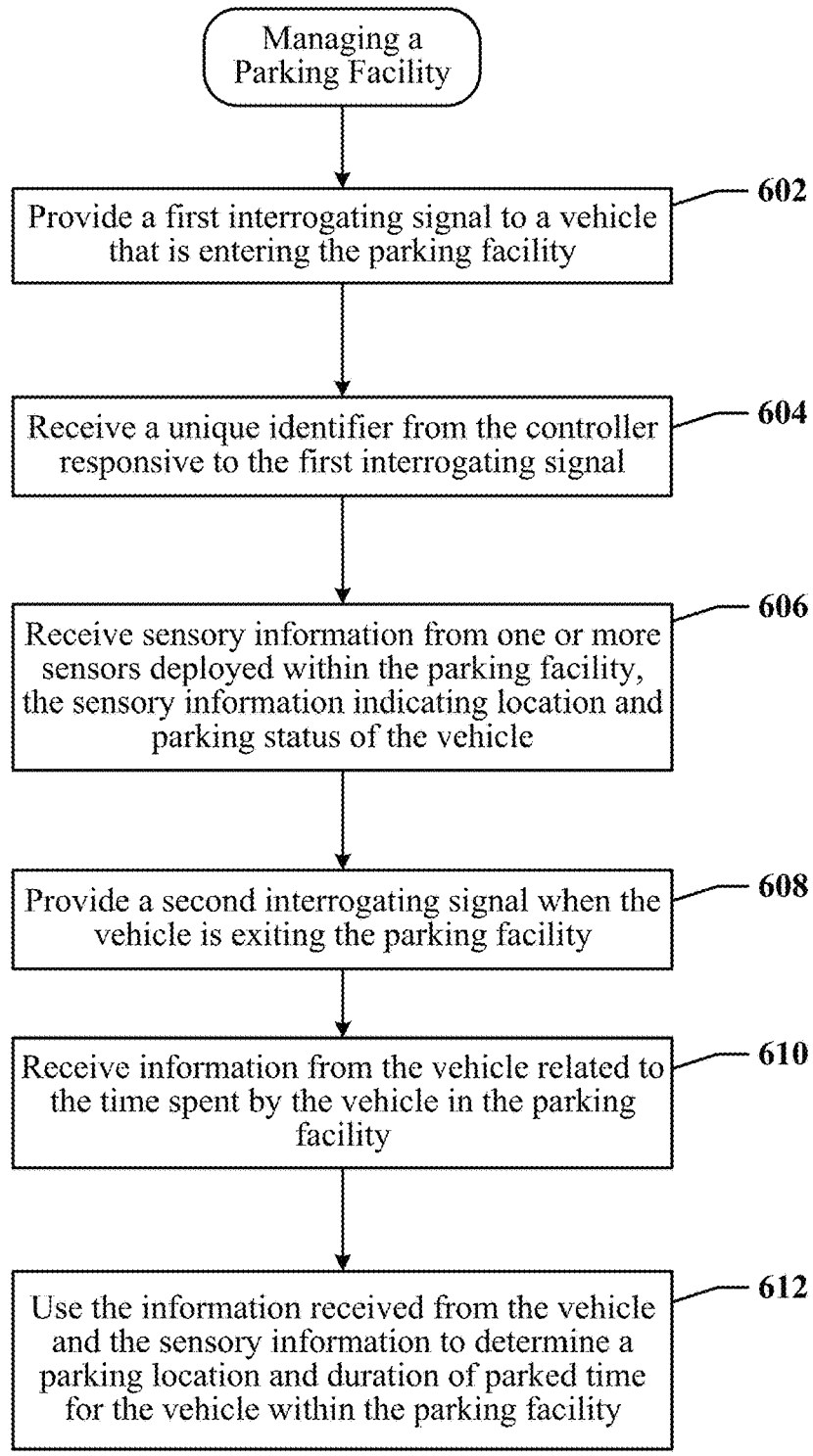
FIG. 6 is a flowchart 600 illustrating a method for managing a parking facility in accordance with certain aspects disclosed herein.

FIG. 6 is a flowchart 600 illustrating a method for managing a parking facility. The method may be performed at a facility device. At block 602, the device may provide a first interrogating signal to a vehicle that is entering the parking facility. At block 604, the device may receive a unique identifier from the controller responsive to the first interrogating signal. At block 606, the device may receive sensory information from one or more sensors deployed within the parking facility, the sensory information indicating location and parking status of the vehicle. At block 608, the device may provide a second interrogating signal when the vehicle is exiting the parking facility. At block 610, the device may receive information from the vehicle related to the time spent by the vehicle in the parking facility. At block 612, the device may use the information received from the vehicle and the sensory information to determine a parking location and duration of parked time for the vehicle within the parking facility.

In one example, the device may receive the unique identifier from the controller responsive to the second interrogating signal. In some examples, the device may exclude time elapsed while the vehicle is moving within the parking facility from an estimate of the duration of parked time for the vehicle within the parking facility. The duration of time in which the vehicle was parked excludes time elapsed while the vehicle is moving within the parking facility.

In some examples, the device may generate an estimate of the duration of parked time for the vehicle within the parking facility from the sensory information when the sensory information indicates that the vehicle is parked within the parking facility. The sensory information may include locational information. In one example, the device may use measurements from three or more sensors to triangulate the parking location. In one example, the device may use measurements of signals received at three or more antennas to triangulate the parking location.

In some examples, the device may receive status information from a communication interface and may determine that the status information indicates that the vehicle is parked within the parking facility. The status information is received from a vehicle management system.

Figure 7:
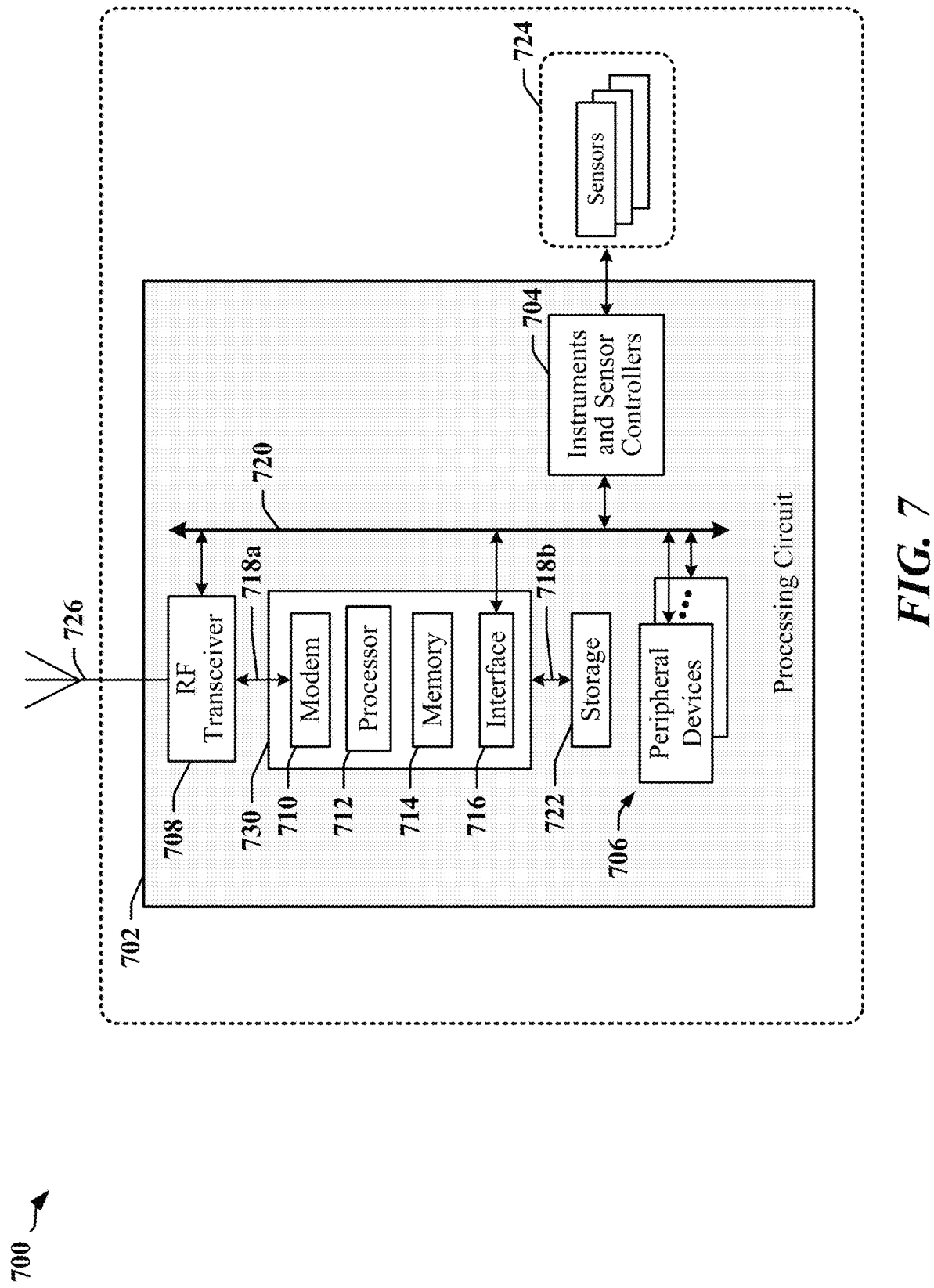
FIG. 7 illustrates an example of an apparatus that may be adapted for use as the in-vehicle device or a parking facility device configured in accordance with certain aspects disclosed herein.

FIG. 7 illustrates an example of an apparatus 700 that may be adapted for use as an in-vehicle device 102 and/or as a parking facility device 104 (see FIG. 1). The apparatus 700 may include a processing circuit 702 that has multiple integrated circuits (ICs) or devices 704, 706 and/or 708, or that may be implemented in one or more application-specific integrated circuit (ASIC) devices or a system on chip (SoC) device. In one example, the processing circuit 702 may include a processing device provided in an ASIC 730, one or more peripheral devices 706, and a transceiver 708 that enables the apparatus to communicate through an antenna 726 with a radio access network, a core access network, the Internet and/or another network.

The ASIC 730 may have one or more processors 712, one or more modems 710, on-board memory 714, a bus interface circuit 716 and/or other logic circuits or functions. The processing circuit 702 may be controlled by an operating system that may provide an application programming interface (API) layer that enables the one or more processors 712 to execute software modules residing in the on-board memory 714 or other processor-readable storage 722 provided on the processing circuit 702. The software modules may include instructions and data stored in the on-board memory 714 or processor-readable storage 722. The ASIC 730 may access its on-board memory 714, the processor-readable storage 722, and/or storage external to the processing circuit 702. The on-board memory 714, the processor-readable storage 722 may include read-only memory (ROM) or random-access memory (RAM), electrically erasable programmable ROM (EEPROM), flash cards, or any memory device that can be used in processing systems and computing platforms. The processing circuit 702 may include, implement, or have access to a local database or other parameter storage that can maintain operational parameters and other information used to configure and operate the apparatus 700 and/or the processing circuit 702. The local database may be implemented using registers, a database module, flash memory, magnetic media, EEPROM, soft or hard disk, or the like. The processing circuit 702 may also be operably coupled to external devices such as the antenna 726, a display, operator controls, such as switches or buttons and/or an integrated or external keypad, among other components. A user interface module may be configured to operate with the display, external keypad, and other devices. through a dedicated communication link or through one or more serial data interconnects.

The processing circuit 702 may provide one or more buses 718*a*, 718*b*, 720 that enable certain devices 706, 708, 730 to communicate. In one example, the ASIC 730 may include a bus interface circuit 716 that includes a combination of circuits, counters, timers, control logic and other configurable circuits or modules. In one example, the bus interface circuit 716 may be configured to operate in accordance with communication specifications or protocols. The processing circuit 702 may include or control a power management function that configures and manages the operation of the apparatus 700.

The processing circuit 702 may include an instrument or sensor controller 704 that provides an interface to a source of sensor data. In one example, the source of sensor data may include one or more sensors 724. The sensors 724 may be coupled to the instrument or sensor controller 704 through a wired or wireless communication link. In some implementations, the sensors 724 may be coupled to the instrument or sensor controller 704 through the RF transceiver 708. In another example, the source of sensor data may include one or more standalone devices or car management systems. The standalone devices or car management systems may be coupled to the instrument or sensor controller 704 through a wired or wireless communication link. In some implementations, the standalone devices or car management systems may be coupled to the instrument or sensor controller 704 through the RF transceiver 708.

In some implementations, the on-board memory 714 or other processor-readable storage 722 includes transitory or non-transitory storage that maintains instructions and information where the instructions are configured to cause the processing circuit 702 to receive a first interrogating signal at a vehicle entering a parking facility. The instructions may cause the processing circuit 702 to respond to the second interrogating signal by monitoring status of the vehicle while the vehicle is present within the parking facility and measuring a duration of time in which the vehicle is parked within the parking facility. The instructions may cause the processing circuit 702 to receive a second interrogating signal when the vehicle is exiting the parking facility and respond to the second interrogating signal by transmitting information that includes the duration of time in which the vehicle was parked within the parking facility.

In one example, the instructions may cause the processing circuit 702 to transmit a unique identifier in response to the first interrogating signal and transmit a unique identifier in response to the second interrogating signal. In one example, the instructions may cause the processing circuit 702 to exclude time elapsed while the vehicle is moving within the parking facility from the duration of time in which the vehicle is parked within the parking facility. In one example, the instructions may cause the processing circuit 702 to receive sensory information from one or more sensors and determine that the sensory information indicates that the vehicle is parked within the parking facility. The one or more sensors may include a piezoelectric motion sensor or an accelerometer. The one or more sensors may include a micro MEMS displacement sensor. The one or more sensors may include a MEMS vibration sensor.

In one example, the instructions may cause the processing circuit 702 to receive vehicle status information from a vehicle management system and determine that the sensory information indicates that the vehicle is parked within the parking facility. The vehicle management system may include a braking management system. The vehicle status information may relate to status of an ignition system or a battery voltage level.

In some implementations, the on-board memory 714 or other processor-readable storage 722 includes transitory or non-transitory storage that maintains instructions and information where the instructions are configured to cause the processing circuit 702 to provide a first interrogating signal to a vehicle that is entering the parking facility, receive a unique identifier from the controller responsive to the first interrogating signal, receive sensory information from one or more sensors deployed within the parking facility, the sensory information indicating location and parking status of the vehicle, provide a second interrogating signal when the vehicle is exiting the parking facility, receive information from the vehicle related to the time spent by the vehicle in the parking facility, and use the information received from the vehicle and the sensory information to determine a parking location and duration of parked time for the vehicle within the parking facility.

In one example, the instructions may cause the processing circuit 702 to receive the unique identifier from the controller responsive to the second interrogating signal. In one example, the instructions may cause the processing circuit 702 to exclude time elapsed while the vehicle is moving within the parking facility from an estimate of the duration of parked time for the vehicle within the parking facility. The duration of time in which the vehicle was parked excludes time elapsed while the vehicle is moving within the parking facility.

In one example, the instructions may cause the processing circuit 702 to generate an estimate of the duration of parked time for the vehicle within the parking facility from the sensory information when the sensory information indicates that the vehicle is parked within the parking facility. The sensory information may include locational information.

In one example, the instructions may cause the processing circuit 702 to use measurements from three or more sensors to triangulate the parking location. In one example, the instructions may cause the processing circuit 702 to use measurements of signals received at three or more antennas to triangulate the parking location.

In one example, the instructions may cause the processing circuit 702 to receive status information from a communication interface and determine that the status information indicates that the vehicle is parked within the parking facility. The status information may be received from a vehicle management system.

In some implementations, the apparatus 700 may be used for managing parking and may be incorporated or installed in a vehicle. The apparatus 700 may have a wireless communication interface and a controller. The controller may be configured to monitor status of the vehicle while the vehicle is present within a parking facility after detecting a first wireless interrogating signal when entering the parking facility, measure a duration of time in which the vehicle is parked within the parking facility, receive a second interrogating signal when the vehicle is exiting the parking facility, and transmit information that includes the duration of time in which the vehicle was parked within the parking facility in response to the second interrogating signal.

In one example, the controller is further configured to transmit a unique identifier in response to the first interrogating signal and transmit a unique identifier in response to the second interrogating signal. In one example, the controller is further configured to exclude time elapsed while the vehicle is moving within the parking facility from the duration of time in which the vehicle is parked within the parking facility.

In one example, the apparatus includes one or more sensors communicatively coupled to the controller. The controller may be further configured to receive sensory information from the one or more sensors and determine that the sensory information indicates that the vehicle is parked within the parking facility. The one or more sensors includes a piezoelectric motion sensor, an accelerometer, a MEMS displacement sensor or a MEMS vibration sensor.

In one example, the controller is further configured to receive vehicle status information from a vehicle management system and determine that the sensory information indicates that the vehicle is parked within the parking facility. The vehicle management system may include a braking management system, a transmission controller, and entertainment system or a climate control system. In one example, the status information relates to status of an ignition system or a battery voltage level.

In some implementations, the apparatus 700 may be used for managing a parking facility and may include a wireless communication interface and a controller configured to cause the wireless communication interface to transmit a first interrogating signal to a vehicle that is entering the parking facility, receive a unique identifier from the controller responsive to the first interrogating signal, receive sensory information from one or more sensors deployed within the parking facility, the sensory information indicating location and parking status of the vehicle, provide a second interrogating signal when the vehicle is exiting the parking facility, receive information from the vehicle related to the time spent by the vehicle in the parking facility, and use the information received from the vehicle and the sensory information to determine a parking location and duration of parked time for the vehicle within the parking facility.

In one example, the controller is further configured to receive the unique identifier from the controller responsive to the second interrogating signal. In one example, the controller is further configured to exclude time elapsed while the vehicle is moving within the parking facility from an estimate of the duration of parked time for the vehicle within the parking facility. The duration of time in which the vehicle was parked excludes time elapsed while the vehicle is moving within the parking facility.

In one example, the controller is further configured to generate an estimate of the duration of parked time for the vehicle within the parking facility from the sensory information when the sensory information indicates that the vehicle is parked within the parking facility. The sensory information may include locational information.

In one example, the controller is further configured to use measurements from three or more sensors to triangulate the parking location. The controller may be further configured to use measurements of signals received at three or more antennas to triangulate the parking location.

In one example, the controller is further configured to receive status information from a communication interface and determine that the status information indicates that the vehicle is parked within the parking facility. The status information is received from a vehicle management system.

Figure 8:
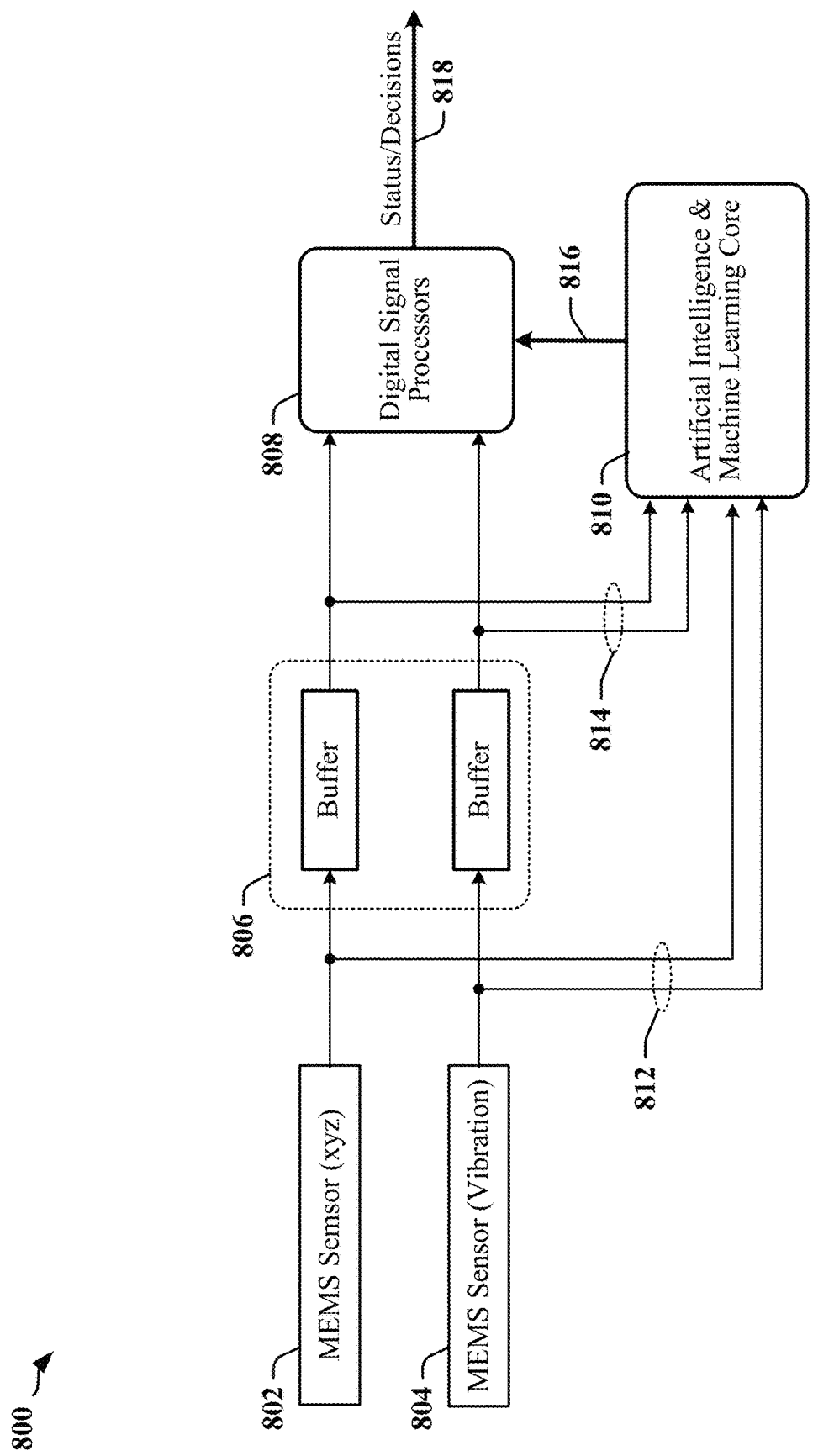
FIG. 8 is a data flow diagram that illustrates the processing of sensor information in accordance with certain aspects of this disclosure.

FIG. 8 is a data flow diagram 800 that illustrates the processing of sensor information to determine the status of a vehicle in a GAC system configured in accordance with certain aspects of this disclosure. In one example, the data flow diagram 800 relates to MEMS sensor information 812 received from at least two MEMS sensor sources 802, 804. In other examples, the data flow diagram 800 relates to sensor information 812 received from other types of sensors. In the illustrated example, the first MEMS sensor source 802 includes one or more MEMS sensors that provide measurements of displacement in three dimensions, where the measurements may be expressed in x, y, z components. The MEMS sensors in the first MEMS sensor source 802 may be located in a vehicle and correlate to displacement of the vehicle. The second MEMS sensor source 804 includes one or more MEMS sensors that provide measurements of vibration detected in the vehicle. The MEMS sensor information 812 may be processed to obtain data representations according to a desired format.

The MEMS sensor information 812 may be provided to buffers 806 and to a processing core 810 configured for artificial intelligence (AI) and machine learning functions. The buffers 806 may be configured to accumulate measurements derived from the MEMS sensor information 812, and to provide one or more time series of measurements 814 to the processing core 810. The processing core 810 may be used to provide training and calibration information 816 to a digital signal processor 808, where the processing core 810 may generate the training and calibration information 816 using statistical analysis, pattern detection, correlation and other techniques to discern patterns and baselines in the time series of measurements 814. The digital signal processor 808, which may be implemented using a conventional processing circuit in some instances, receives the time series of measurements 814 and uses the training and calibration information 816 to generate decisions 818 indicative of state, status and mode of operation of the corresponding vehicle.

In one example, the digital signal processor 808 may determine an algorithmic minimum vibration in data received from the second MEMS sensor source 804. Determination of the algorithmic minimum may be based on the training and calibration information 816. The digital signal processor 808 may indicate that the vehicle is parked or at rest when the algorithmic minimum is detected. After indicating that the vehicle is parked or at rest, the digital signal processor 808 may indicate that the vehicle is no longer parked or started and in an active state when the data received from the second MEMS sensor source 804 is not consistent with the algorithmic minimum vibration. In some examples, the digital signal processor 808 may take into consideration displacement measurements when determining vehicle state. In some instances, a preconfigured or user-defined set of classes may be provided to identify when vibration measurements correspond to zero vibration values.

In some examples, the buffers 806 may be configured to compress received MEMS sensor information 812 and to produce dynamic data batches that may be handled by the processing core 810 or digital signal processor 808. In one example, continuous samples of MEMS displacement data may be compressed by a factor of three. The compressed MEMS displacement data may be used train the MEMS sensors that serve as the first MEMS sensor source 802. The MEMS sensors may be trained to know when displacements corresponding to x, y and z components resolve to a zero-movement state. Machine learning techniques may be used to identify data patterns that indicate zero-movement. In some instances, a preconfigured or user-defined set of classes may be provided to identify when the x, y and z components correspond to zero displacement values.

In one example, MEMS sensors collect displacement and vibration sensor data over a ten second period. These data, which are stored as real-time, collected batches of data in this example of a time-series mode. The real-time, collected batches of data may be processed in the frequency domain using a frequency-based transformation of time-series samples. In one example, a Discrete-Frequency-Transformation (DFT) algorithm may be used to represent time series data in a set of frequency bins. The frequency bins or spectra for both MEMS sensors may be analyzed. In a first example, the frequency spectrum for the displacement MEMS sensor may be analyzed in order to calculate when a minimum displacement occurs, particularly in the (X-Y) subset of directions. In a second example, the frequency spectrum for the vibration MEMS sensor may be analyzed in order to calculate when there is zero detectable vibration.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A method for tracking a vehicle in a parking facility, comprising:
   accumulating measurements in the vehicle, the measurements being derived from one or more sensors to obtain one or more time series of measurements;
   generating training and calibration information from the one or more time series of measurements using a processing core configured for artificial intelligence (AI) and machine learning;
   using a processing circuit of the vehicle that is calibrated by the training and calibration information to generate decisions indicative of state, status and mode of operation of the vehicle from a time series of measurements collected from sensors while the vehicle is present within the parking facility;
   receiving, at the vehicle, a first interrogating signal as the vehicle enters the parking facility through an entry point of the parking facility;
   transmitting a unique vehicle identifier corresponding to the vehicle in a response to the first interrogating signal;
   receiving a second interrogating signal at the vehicle when the vehicle is within the parking facility or exiting the parking facility through an exit point of the parking facility; and
   responsive to the second interrogating signal, transmitting from the vehicle:
      the unique vehicle identifier; and
      historical information based on the state, status and mode of operation of the vehicle indicated by decisions generated by the processing circuit from the time series of measurements generated while the vehicle is present within the parking facility, the historical information including locational information indicating locations or changes of location of the vehicle within the parking facility as recorded by the vehicle.

2. The method of claim 1, further comprising using the processing circuit to monitor status of the vehicle by:
   determining a relative location or a change of location of the vehicle based on motion indicated by the one or more sensors; and
   transmitting the relative location or the change of location when wireless communication is available before the vehicle receives the second interrogating signal.

3. The method of claim 1, further comprising:
   excluding time elapsed while the vehicle is moving within the parking facility from a duration of time in which the vehicle is parked within the parking facility.

4. The method of claim 1, using the processing circuit to monitor status of the vehicle by:
   receiving sensory information comprising measurements of displacement and vibration sensor data collected from the one or more sensors over a ten second period; and determining whether the sensory information indicates that the vehicle is parked within the parking facility.

5. The method of claim 4, wherein the one or more sensors includes a piezoelectric motion sensor or an accelerometer.

6. The method of claim 4, wherein the one or more sensors includes a micro-electromechanical system (MEMS) displacement sensor.

7. The method of claim 4, wherein the one or more sensors includes a MEMS vibration sensor.

8. The method of claim 1, using the processing circuit to monitor status of the vehicle by:
receiving vehicle status information from a vehicle management system; and
determining that the vehicle status information indicates that the vehicle is parked within the parking facility.

9. The method of claim 8, wherein the vehicle management system comprises a braking management system.

10. The method of claim 8, wherein the vehicle status information relates to status of an ignition system or a battery voltage level.

11. A system provided in a vehicle for tracking the vehicle within a parking facility, comprising:
buffers configured to accumulate measurements derived from one or more sensors and further configured to provide one or more time series of measurements to a processing core configured for artificial intelligence (AI) and machine learning, the accumulated measurements including vibration measurements;
a processing circuit calibrated by training and calibration information generated by the processing core and configured to generate decisions indicative of state, status and mode of operation of the vehicle based on the one or more time series of measurements;
a wireless communication interface; and
a controller configured to:
transmit a unique vehicle identifier corresponding to the vehicle after detecting a first interrogating signal when entering the parking facility through an entry point of the parking facility;
receive a second interrogating signal at the vehicle when the vehicle is within the parking facility or exiting the parking facility through an exit point of the parking facility; and
transmit information in response to the second interrogating signal, including:
the unique vehicle identifier; and
historical information based on the state, status and mode of operation of the vehicle indicated by decisions generated by the processing circuit from the time series of measurements collected from sensors while the vehicle is present within the parking facility, the historical information including locational information indicating locations or changes of location of the vehicle within the parking facility and recorded by the vehicle.

12. The system of claim 11, wherein the controller is further configured to:
determine a relative location or a change of location of the vehicle based on motion indicated by the one or more sensors; and
transmit locational information from the vehicle to a parking facility server when wireless communication is available before the vehicle receives the second interrogating signal.

13. The system of claim 11, wherein the controller is further configured to:
exclude time elapsed while the vehicle is moving within the parking facility from a duration of time in which the vehicle is parked within the parking facility.

14. The system of claim 11, wherein the controller is further configured to:
receive sensory information comprising measurements of displacement and vibration sensor data collected from the one or more sensors over a ten second period; and
determine that the sensory information indicates that the vehicle is parked within the parking facility.

15. The system of claim 14, wherein the one or more sensors includes a piezoelectric motion sensor or an accelerometer.

16. The system of claim 14, wherein the one or more sensors includes a micro-electromechanical system (MEMS) displacement sensor.

17. The system of claim 14, wherein the one or more sensors includes a micro-electromechanical system (MEMS) vibration sensor.

18. The system of claim 11, wherein the controller is further configured to:
receive vehicle status information from a vehicle management system; and
determine that the vehicle status information indicates that the vehicle is parked within the parking facility.

19. The system of claim 18, wherein the vehicle management system comprises a braking management system.

20. The system of claim 18, wherein the vehicle status information relates to status of an ignition system or a battery voltage level.

* * * * *